United States Patent [19]
Ma

[11] Patent Number: 5,570,267
[45] Date of Patent: Oct. 29, 1996

[54] FLAT DISPLAY MODULE

[76] Inventor: Hsi-Kuang Ma, 4F, No. 48, Sec. 2, Chung Cherng Rd., Taipei, Taiwan

[21] Appl. No.: 501,615

[22] Filed: Jul. 12, 1995

[51] Int. Cl.$^6$ ............................ H05K 7/14; G02F 1/1333
[52] U.S. Cl. ............................ 361/681; 361/679; 359/83
[58] Field of Search .................................. 361/679–682; 359/83

[56] References Cited

U.S. PATENT DOCUMENTS

| | | | |
|---|---|---|---|
| 5,041,965 | 8/1991 | Chen | 345/7 |
| 5,479,285 | 12/1995 | Burke | 359/83 |

*Primary Examiner*—Leo P. Picard
*Assistant Examiner*—Jaypraksh N. Gandhi
*Attorney, Agent, or Firm*—Bacon & Thomas

[57] ABSTRACT

A flat display module including a display unit; a protective cover fastened to the top side of the display unit by screws, having a plurality of retaining notches and a plurality of retainer rods at two opposite sides; a display holder frame for holding the display unit and the protective cover on the inside, the display holder frame having a rectangular center opening, which receives the display unit and the protective cover, a plurality of hooks and retaining holes respectively fastened to the retaining notches and retainer rods of the protective cover, a plurality of outward half-round lugs at one side, and a wire hole adjacent to one half-round lug; a stiff backing fastened to the bottom side of the display holder frame by screws, having a plurality of outward half-round lugs respectively matched with the outward half-round lugs of the display holder frame for connection to a computer mainframe by pivots; and a lead wire inserted through the wire hole on the display holder frame, having a first electrical connector at one end connected to the electrical connector of the display unit and a second electrical connector at an opposite end outside the display holder frame for connection to the computer mainframe.

8 Claims, 3 Drawing Sheets

FLAT DISPLAY MODULE

BACKGROUND OF THE INVENTION

The present invention relates to display modules for computers, and relates more particularly to such a flat display module which can be conveniently dismounted for a repair work.

A regular notebook computer generally comprises a mainframe, a keyboard mounted on the mainframe, and a liquid crystal display module hinged to the mainframe. This display module can also used in a desk-top computer or desk-top display device. When a display module is used in a desk-top computer or desk-top display device, it is not made liftable. FIG. 1 shows a regular liquid crystal display module hinged to the mainframe E of a notebook computer. This structure of liquid crystal display module comprises a bottom cover B, display unit A mounted within the bottom cover B, and a top cover C covered on the bottom cover B over the display unit A, and a lead wire D connected to the mainframe E. The display unit A is fastened to the bottom cover B by screws. The top cover C is fastened to the bottom cover by screws. The main disadvantage of this structure of display module is its complicated mounting process, thereby rendering the repair work difficult.

SUMMARY OF THE INVENTION

The present invention has been accomplished under the circumstances in view. It is one object of the present invention to provide a flat display module which is easy to assemble. It is another object of the present invention to provide a flat display module which can be conveniently dismounted for a repair work. It is still another object of the present invention to provide a flat display module which allows the display unit with the protective cover to be used as a projecting board.

According to the present invention, the flat display module comprises a display unit; a protective cover fastened to the top side of the display unit by screws, having a plurality of retaining notches and a plurality of retainer rods at two opposite sides; a display holder frame for holding the display unit and the protective cover on the inside, the display holder frame having a rectangular center opening, which receives the display unit and the protective cover, a plurality of hooks and retaining holes respectively fastened to the retaining notches and retainer rods of the protective cover, a plurality of outward half-round lugs at one side, and a wire hole adjacent to one half-round lug; a stiff backing fastened to the bottom side of the display holder frame by screws, having a plurality of outward half-round lugs respectively matched with the outward half-round lugs of the display holder frame for connection to a computer mainframe by pivots; and a lead wire inserted through the wire hole on the display holder frame, having a first electrical connector at one end connected to the electrical connector of the display unit and a second electrical connector at an opposite end outside the display holder frame for connection to the computer mainframe.

DETAILED DESCRIPTION OF THE PREFERRED EMBODIMENT

Figure 1:
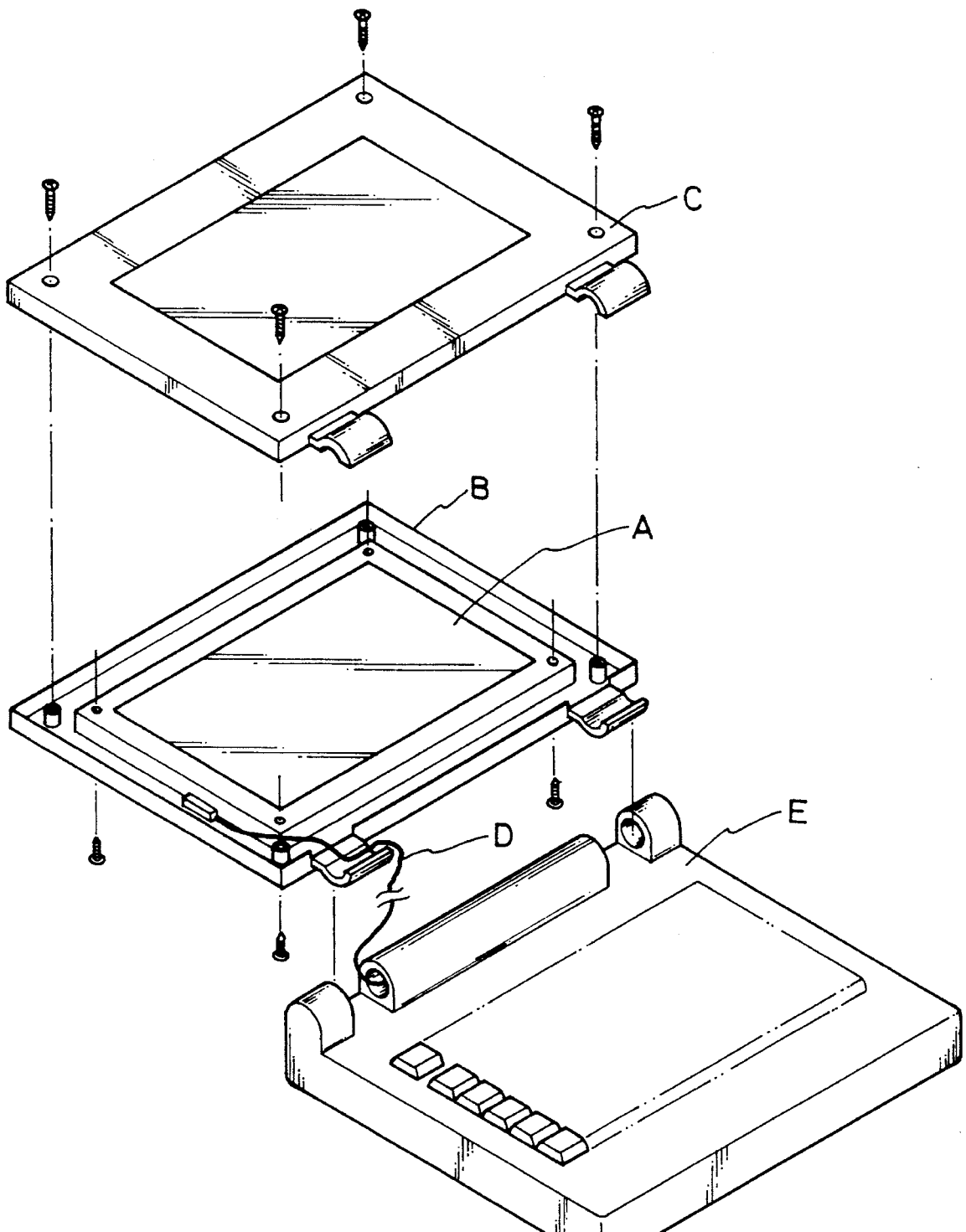
FIG. 1 is an exploded view of a flat display module according to the prior art.
Figure 2:
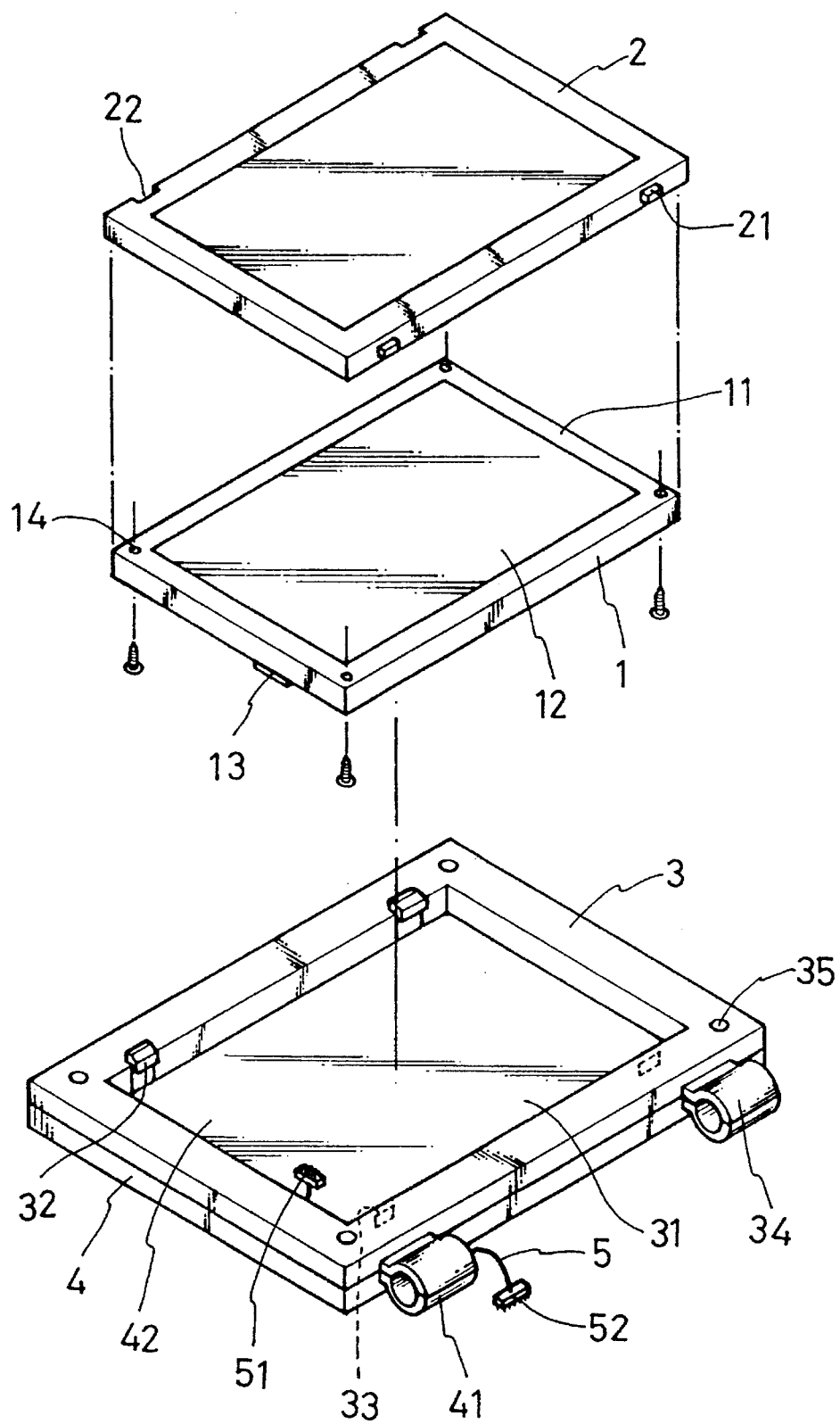
FIG. 2 is an exploded view of a flat display module according to the present invention.

Referring to FIG. 2, a flat display module in accordance with the present invention is generally comprised of a rectangular display unit 1, a rectangular protective cover 2, a rectangular display holder frame 3, a rectangular stiff backing 4, and a lead wire 5. The flat display unit 1 is comprised of a frame 11, a flat display 12 mounted within the frame 11, and an electrical connector 13 mounted on the bottom side of the frame 11 and electrically connected to the display 12. The frame 11 has four mounting holes 14 respectively disposed in the four corners. The protective cover 2 is slightly bigger than the display unit 1, having a plurality of mounting holes (not shown) at the bottom respectively connected to the mounting holes 14 of the frame 11 by screws, a plurality of retainer rods 21 at one side, and a plurality of retaining notches 22 at an opposite side. The display holder frame 3 comprises a rectangular center opening 31, which receives the display unit 1, a plurality of hooks 32 and a plurality of retaining holes 33 bilaterally disposed on the inside and respectively fastened to the retaining notches 22 and retainer rods 21 on the protective cover 2, four mounting holes 35 in the four corners, and a plurality of outward half-round lugs 34 at one side. The stiff backing 4 fits the display holder frame 3 at one side, comprising a plurality of mounting holes (not shown) respectively fastened to the mounting holes 35 of the display holder frame 3 by screws, and a plurality of outward half-round lugs 41 respectively matched with the half-round lugs 34 of the display holder frame 3. The half-round lugs 34 of the display holder frame 3 and the half-round lugs 41 of the stiff backing 4 form a plurality of axle housings for connection to the computer mainframe (not shown) by a respective pivot. The lead wire 5 is inserted through a wire hole (not shown) on the display holder frame 3, having a first electrical connector 51 at one end connected to the electrical connector 13 of the display unit 1 and a second electrical connector 52 at an opposite end for connection to the master board of the computer mainframe. During a repair work, the protective cover 2 and the display unit 1 can be conveniently removed from the display holder frame 3 by disconnecting the hooks 32 from the retaining notches 22 and then disconnecting the electrical connector 13 of the display unit 1 from the first electrical connector 51 of the lead wire 5.

Figure 3:
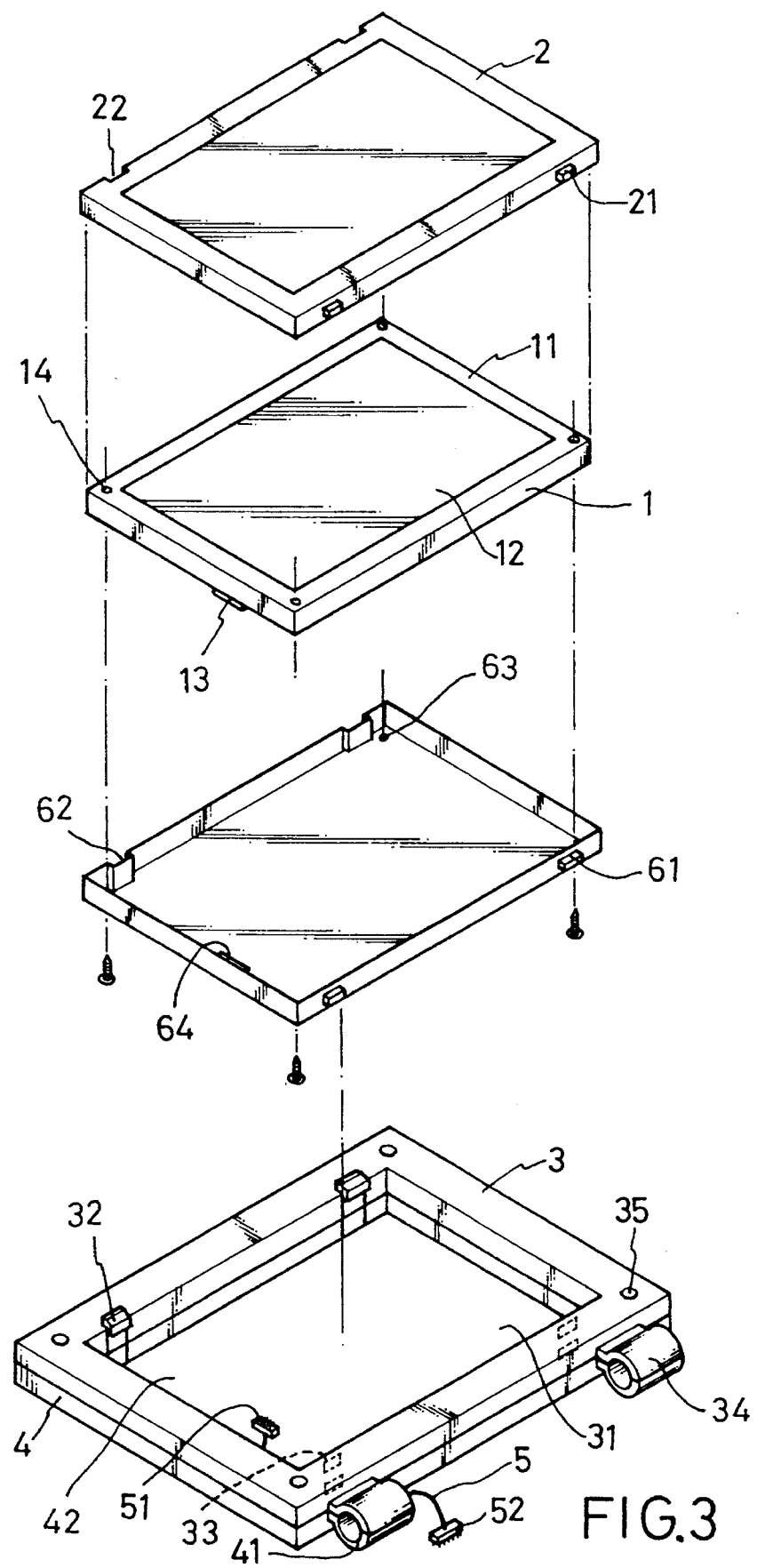
FIG. 3 is an exploded view of an alternate form of the present invention.

FIG. 3 shows an alternate form of the present invention, in which: the stiff backing 4 has a center opening 42 aligned with the center opening 31 of the display holder frame 3, and a flat casing 6 is mounted within the center opening 42 of the stiff backing 4 in flush with the back side of the stiff backing 4 to hold the display unit 1 inside the display holder frame 3. The flat casing 6 comprises a plurality of mounting holes 63 respectively connected to the mounting holes 14 of the display unit 1 and the mounting holes of the protective cover 2, a connector hole 64, which receives the electrical connector 13 of the display unit 1, a plurality of retainer rods 61 at one side respectively fitted into respective retaining holes (not shown) on the stiff backing 4, and a plurality of recessed portions 62 respectively and vertically matched with the retaining notches 22 of the protective cover 2. This alternate form permits the display unit 1 to be unloaded from the display holder frame 3 or the stiff backing 4.

It is to be understood that the drawings are designed for purposes of illustration only, and are not intended as a definition of the limits and scope of the invention disclosed. For example, the display holder frame 3 and the stiff backing 4 can be connected together by hook joints; the connection between the protective cover 2 and the display holder frame 3 can be secured by screws; the connection between the casing 6 and the stiff backing 4 can be secured by screws.

I claim:

1. A flat display module comprising:

a flat display unit including a frame, a flat display mounted within the frame, and an electrical connector mounted on the frame at a bottom side;

a protective cover covered on said display unit;

a display holder frame for holding said display unit and said protective cover on the inside, said display holder frame comprising a rectangular center opening, which receives said display unit and said protective cover, a plurality of outward half-round lugs at one side, and a wire hole adjacent to one half-round lug;

a stiff backing covered on said display holder frame at a bottom side to support said display unit inside said display holder frame, said stiff backing comprising a plurality of outward half-round lugs respectively matched with the outward half-round lugs of said display holder frame for connection to a computer mainframe by pivots;

a lead wire inserted through the wire hole on said display holder frame, having a first electrical connector at one end connected to the electrical connector of said display unit and a second electrical connector at an opposite end outside said display holder frame for connection to the computer mainframe;

fastening means to fasten said protective cover and said display unit together;

retainer means to hold protective cover and said display holder frame together; and connecting means to connect said stiff backing and said protective cover together.

2. The flat display module of claim 1 further comprising a flat casing mounted in a center opening on said stiff backing and abutted against said protective cover to hold said display unit on the inside, said casing comprising a connector hole, which receives the electrical connector of said display unit, a plurality of coupling portions respectively connected to said fastening means and said retainer means.

3. The flat display module of claim 1 wherein said fastening means comprises a plurality of mounting holes respectively made on the frame of said display unit and said protective cover, and a plurality of screws respectively threaded into the mounting holes on the frame of said display unit and the mounting holes on said protective cover.

4. The flat display module of claim 1 wherein said fastening means comprises a plurality of female elements and a plurality of male elements respectively made on said display unit and said protective cover for permitting said display unit and said protective cover to be fastened together by fastening said male elements to said female elements.

5. The flat display module of claim 1 wherein said retainer means comprises a plurality of retaining notches and retainer rods respectively made on said protective cover at two opposite sides, a plurality of hooks and retaining holes bilaterally made on said display holder frame on the inside and respectively fastened to the retaining notches and retainer rods of said protective cover.

6. The flat display module of claim 1 wherein said retainer means comprises a plurality of screws respectively threaded into respective screw holes on said display holder frame and respective screw holes on said protective cover.

7. The flat display module of claim 1 wherein said connecting means comprises a plurality of screws respectively threaded into respective mounting holes on said stiff backing and respective mounting holes on said protective cover.

8. The flat display module of claim 1 wherein said connecting means comprises a hole for passing said lead wire.

* * * * *